(No Model.) 3 Sheets—Sheet 1.
M. G. BUNNELL.
MACHINE FOR MAKING AND REPAIRING ROADS.
No. 455,704. Patented July 7, 1891.
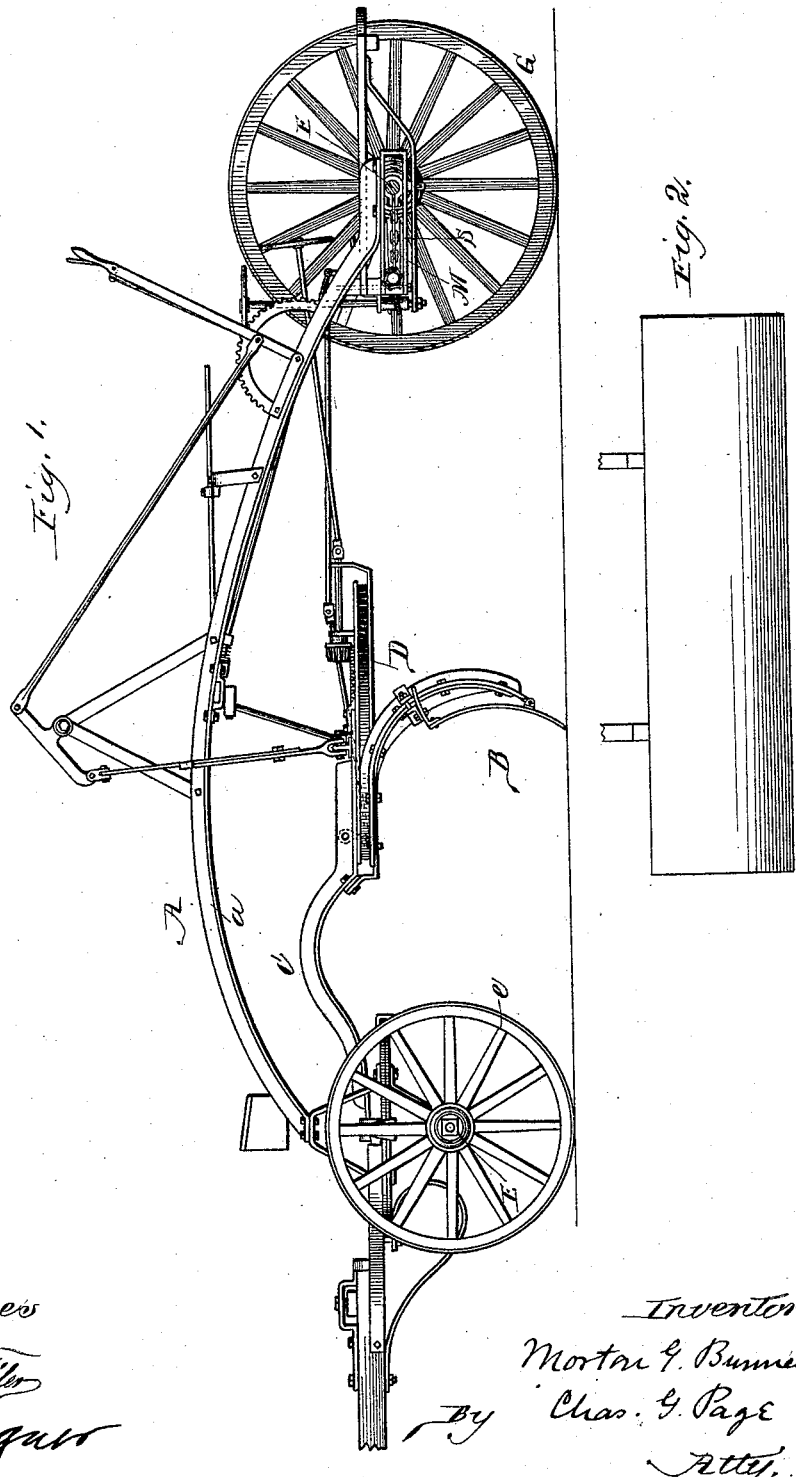
Witnesses
Inventor
Morton G. Bunnell
By Chas. G. Page
Atty.

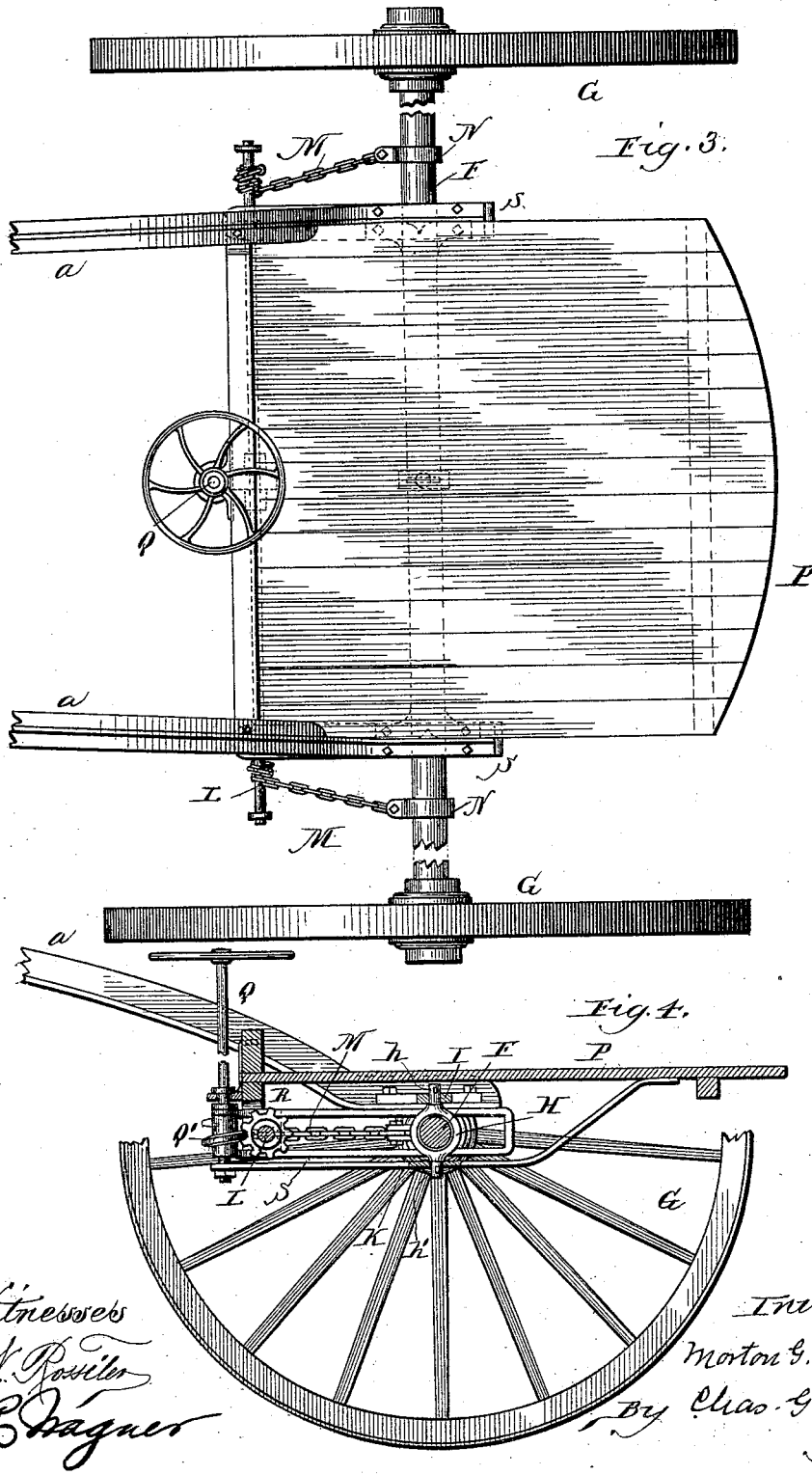

(No Model.) 3 Sheets—Sheet 3.
M. G. BUNNELL.
MACHINE FOR MAKING AND REPAIRING ROADS.
No. 455,704. Patented July 7, 1891.
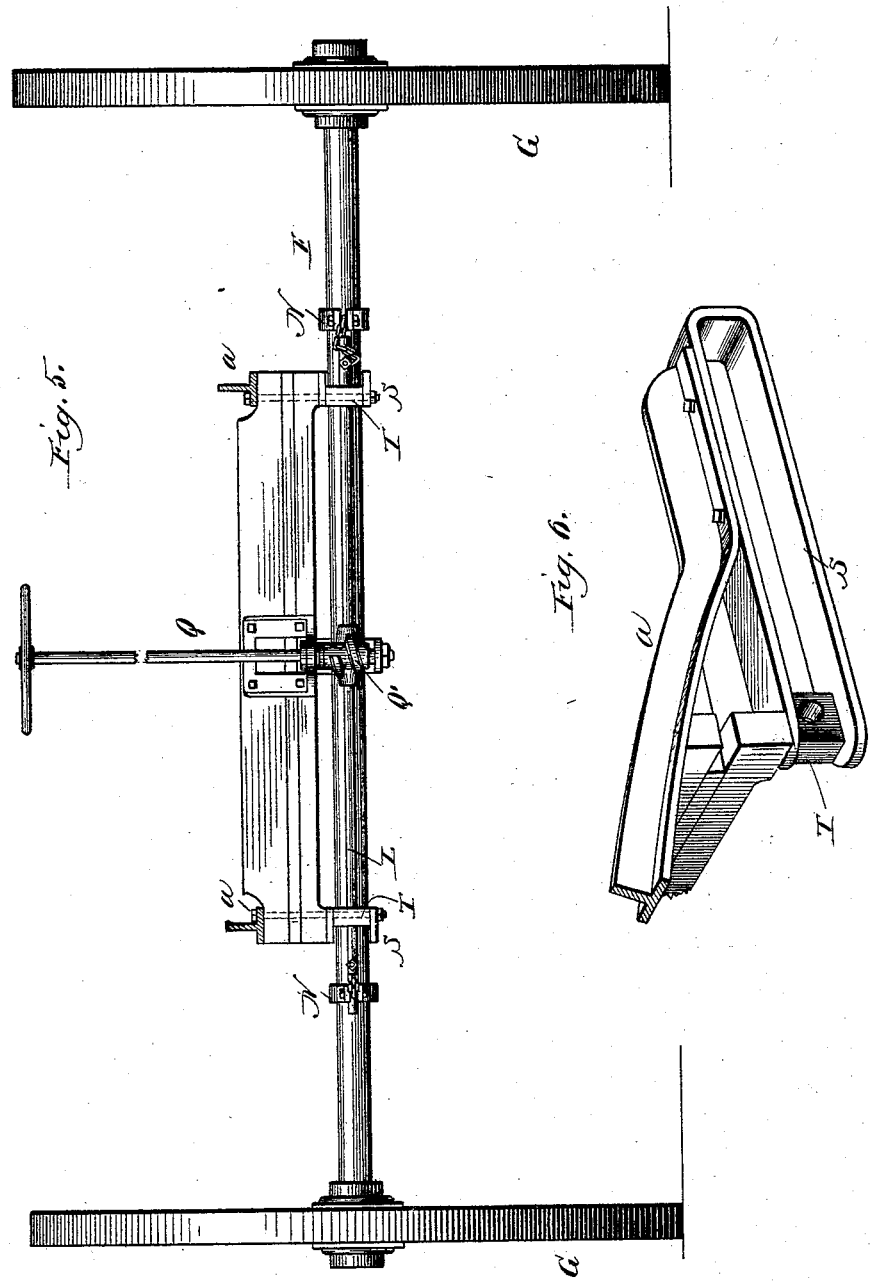

UNITED STATES PATENT OFFICE.

MORTON G. BUNNELL, OF CHICAGO, ILLINOIS, ASSIGNOR, BY MESNE ASSIGNMENTS, TO ANNA B. AUSTIN, OF SAME PLACE.

MACHINE FOR MAKING AND REPAIRING ROADS.

SPECIFICATION forming part of Letters Patent No. 455,704, dated July 7, 1891.

Application filed October 27, 1890. Serial No. 369,462. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to a construction of road-making and road-repairing machines involving a long scraper-blade arranged below the body-frame and adjustable so that it can be set more or less oblique to the line of progression, and a horizontally-swinging rear axle which is pivotally connected with the body-frame and adjustable about its said pivotal connection, so that it can be set at different angles to the length of the body-frame with reference to the position of the blade and the work that is to be performed.

The object of my invention is to provide novel, simple, powerful, and otherwise improved means for adjusting the horizontally-swinging rear axle about its pivoted connection with the body-frame; and to the attainment of these and other useful ends it consists in matters hereinafter set forth, and particularly pointed out in the claims.

In the accompanying drawings, Figure 1 represents in side elevation a road-making and road-repairing machine embodying my invention. Fig. 2 represents the long scraper-blade. Fig. 3 represents, on a somewhat larger scale than the preceding figures, a top plan view of the rear portion of the machine, the long rear axle being, for convenience of illustration, broken away at points between the body-frame and wheels. Fig. 4 is a vertical central section through Fig. 3, the hand-wheel shaft and its worm being shown in elevation and for convenience of illustration broken away at a point between the worm and hand-wheel. Fig. 5 is a front end elevation of the portion of the machine shown in Fig. 3. Fig. 6 is a detail view mainly representing in perspective one of the guide-bearings for the rear axle secured to one of the side bars of the body-frame.

In said drawings, A indicates the wheeled body-frame of the machine, and B denotes the long scraper-blade, which is arranged below the body-frame and suspended therefrom by suitable raising and lowering devices. The blade is arranged to extend across the width of the machine, and is pivotally held between its ends, so that it can be swung horizontally about its vertical center or thereabout, for the purpose of placing it more or less oblique to the line of progression of the machine.

The devices for raising and lowering the blade may be of any suitable construction, but are understood to permit an attendant on the machine to raise and lower the blade bodily, and also to lower the forward end of the blade to an extent proportional to the required depth of cut.

While the scraper-blade could be pushed from the rear of the machine and pivoted between its ends in various ways, I prefer to draw it by means of a swinging draft-bar C and to connect it with a turn-table or circle D, which is pivotally connected with the draft-bar at a point sufficiently forward of the rear wheels to allow the blade to be swung horizontally either way, and thereby permit its ends to be alternately placed ahead.

The body-frame of the machine is pivotally supported upon the front axle, so that, while the front axle E, which is supported by wheels $e$, can be turned independently of the body-frame for the purpose of turning the machine, the body-frame can be swung to either side independently of the front axle.

The body-frame is at its rear end portion pivotally supported upon the long rear axle F, which is extended beyond the sides of the body-frame, so as to permit said axle to be swung horizontally to a suitable extent about a point midway of its ends without its allotted wheels G running into the body-frame. The pivotal connection between the body-frame and rear axle is made at a point intermediate of the ends of the latter and on the longitudinal middle line of the body-frame, and as a convenient way of pivoting said members together I have herein fixed upon the axle a collar H, having upper and lower vertical pivots $h\ h'$ respectively engaging in bearings I K on the body-frame. This construction of pivot is included in the subject-matter of my pending application, Serial No. 363,273, filed August 28, 1890.

As a means for swinging the rear axle about its pivotal connection with the body-frame, I arrange in front of said axle a horizontal rotary winding-shaft L, which is mounted in bearings on the body-frame and arranged transversely to the length of the same. The winding-shaft connects with the extended end portions of the rear axle through the medium of chains M or equivalent flexible connections—such, for example, as cables. The chains are so applied to the winding-shaft that when said shaft is turned either way one of the chains will wind upon the shaft and the other chain will unwind therefrom. Hence by operating the winding-shaft one or the other end of the rear axle can be drawn forward, according to the direction in which the winding-shaft is rotated. The winding-shaft can, if desired, be provided with fixed pulleys for the chains, but such devices are not necessary. The chains can be attached to the rear axle in any suitable way—as, for example, they can be attached to collars or clips N, fixed on the axle.

As a means for operating the winding-shaft, I provide at a point adjacent to the forward end of the attendant's platform P a hand-wheel shaft Q, having a worm Q' arranged to engage a worm-wheel R, fixed on the winding-shaft.

The provision of a worm on the hand-wheel shaft engaging a worm-wheel on the horizontally-arranged winding-shaft affords not only a device of great power for operating the winding-shaft so as to adjust the swinging axle, but also affords a simple and reliable means for locking the winding-shaft against rotation. The position of the winding-shaft also permits the hand-wheel on shaft Q to be brought within convenient reach of an attendant standing upon platform P, and hence the operator can readily swing the rear axle while the machine is in operation. The axle is held in position by the chains or other similar flexible connections employed, but is at all times free to respond to the pull of either chain, it being understood that when the winding-shaft is rotated one of the chains will wind thereon and thereby swing the axle, while simultaneously therewith the other chain will unwind, so as to allow one end of the axle to swing to the rear to an extent proportional to the forward swing of its other end. The rear axle is guided and steadied against end tilt by the guide-bearings S, which are secured to the under side of the body-frame at or adjacent to its sides, a convenient disposition of such guide-bearings being to bolt them to the side bars a of the body-frame. The guide-bearings are extended sufficiently to provide between their upper and lower walls a space proportional to the greatest desired extent of swing on the part of the rear axle, and also sufficient to permit bearings T for the ends of the winding-shaft to be secured within said guide-bearings at the forward ends of the latter.

By operating the winding-shaft the rear axle can be set at various angles to the length of the body-frame for various purposes. Thus by swinging the rear axle so as to place it oblique to the line of progression and out of parallelism with the front axle its wheels will run to one side until the two axles are again parallel. The body-frame will, however, be now oblique to the line of progression. The disposition of the rear wheels to run straight ahead will under such conditions counteract any side draft, and by adjusting the rear axle, as aforesaid, to a proper extent one of its wheels can be brought in alignment with one of the front wheels, although the rear axle is much longer than the front axle.

The side movement of the body-frame involved in the foregoing also serves as a means for changing the position of the scraper-blade.

What I claim as my invention is—

1. The combination, substantially as hereinbefore set forth, in a machine for making and repairing roads, of a four-wheeled body-frame pivotally supported upon front and rear axles, a diagonally-adjustable scraper-blade carried below the body-frame and arranged to extend across the space between the front and rear wheels, and a horizontally-arranged rotary winding-shaft supported upon the body-frame and connected with the end portions of the horizontally-swinging rear axle by chains or like flexible connections arranged to respectively wind upon and unwind from the winding-shaft when the latter is operated so as to adjust said axle, for the purpose described.

2. The combination, substantially as hereinbefore set forth, in a machine for making and repairing roads, of a four-wheeled body-frame pivotally supported upon the front and rear axles, a diagonally-adjustable scraper-blade carried below the body-frame and arranged to extend across the space between the front and rear wheels, a rotary winding-shaft supported upon the body-frame and connected with the horizontally-swinging rear axle by chains or like flexible connections arranged to respectively wind upon and unwind from the winding-shaft when the latter is rotated so as to adjust said axle, and a gear for operating the rotary winding-shaft, for the purpose described.

3. The combination, substantially as hereinbefore set forth, in a road-making and road-repairing machine provided with a wheeled body-frame and a diagonally-adjustable scraper-blade carried below the body-frame and arranged to extend across the space between the front and rear wheels, of a horizontally-swinging rear axle pivotally connected between its ends with the body-frame, guide-bearings S, secured to the body-frame and providing horizontally-arranged guideways, through which the end portions of the rear axle are extended, and a horizontally-arranged rotary winding-shaft connected with the end portions of the rear axle by chains or like flexible connections and journaled in bearings in said guide-bearings.

4. The combination, substantially as hereinbefore set forth, in a machine for making and repairing roads, of the horizontally-swinging rear axle pivoted between its ends to the body-frame of the machine, the rotary winding-shaft connected with the rear axle by chains M or like flexible connections, a hand-wheel shaft connected with the winding-shaft by a gear, and a bearing K, secured to the body-frame and providing bearings both for the lower end of the hand-wheel shaft and a pivot on the rear axle.

MORTON G. BUNNELL.

Witnesses:
H. C. KENNEDY,
CHAS. G. PAGE.